(12) United States Patent
Ranieri et al.

(10) Patent No.: US 9,441,967 B2
(45) Date of Patent: Sep. 13, 2016

(54) LASER LEVEL SYSTEM

(71) Applicant: STANLEY BLACK & DECKER, INC., New Britain, CT (US)

(72) Inventors: Eric Ranieri, Pouilley-les-Vignes (FR); Spencer Paul Maheu, West Hartford, CT (US); Kenneth W. Strickland, South Glastonbury, CT (US); Daniel Sadowski, Kensington, CT (US)

(73) Assignee: STANLEY BLACK & DECKER INC., New Britain, CT (US)

( * ) Notice: Subject to any disclaimer, the term of this patent is extended or adjusted under 35 U.S.C. 154(b) by 361 days.

(21) Appl. No.: 13/907,260

(22) Filed: May 31, 2013

(65) Prior Publication Data

US 2014/0352161 A1    Dec. 4, 2014

(51) Int. Cl.
| | |
|---|---|
| G01C 5/00 | (2006.01) |
| G01C 15/06 | (2006.01) |
| G01C 1/02 | (2006.01) |
| G01C 15/10 | (2006.01) |
| G01C 15/00 | (2006.01) |
| G01C 1/00 | (2006.01) |

(52) U.S. Cl.
CPC .............. *G01C 15/06* (2013.01); *G01C 15/004* (2013.01); *G01C 1/00* (2013.01); *G01C 1/02* (2013.01); *G01C 15/002* (2013.01); *G01C 15/105* (2013.01)

(58) Field of Classification Search
CPC   G01C 15/004; G01C 15/002; G01C 15/105; G01C 1/02; G01C 1/00
USPC .................................................... 33/291, 299
See application file for complete search history.

(56) References Cited

U.S. PATENT DOCUMENTS

| | | | |
|---|---|---|---|
| 2,650,788 | A | 9/1953 | Hulstein |
| 4,031,629 | A | 6/1977 | Paluck |

(Continued)

FOREIGN PATENT DOCUMENTS

| | | |
|---|---|---|
| DE | 354541 | 6/1922 |
| DE | 7306878 | 10/1973 |

(Continued)

OTHER PUBLICATIONS

Bosch PCL 20 Cross Line Laser Level, Jan. 11, 2010, Amazon.co.uk, retrieved from the internet: Mar. 25, 2015. <URL: http://www.amazon.co.uk/Bosch-Cross-Line-Laser-Level/dp/B001T9MY0U>.*

(Continued)

*Primary Examiner* — Yaritza Guadalupe-McCall
(74) *Attorney, Agent, or Firm* — Stephen R. Valancius

(57) ABSTRACT

The present disclosure relates to a laser level system. The laser level system includes a laser level, a quick connect tool mounting bracket, and/or other components. The laser level may be mounted to the quick connect tool mounting bracket in one or more different orientations via a quick connect adapter. The quick connect adapter may be removably coupled with the bracket and/or one or more quick connect mounts supported by one or more external surfaces a housing of the laser level. One or more laser beams generated by the laser level may be controlled via a controller to visually indicate whether the laser level is in a "manual" mode, whether the laser level is in a "self-leveling" mode, and/or whether the laser level is "out of level" while in the "self-leveling" mode. In some embodiments, the laser level system includes a self-leveling mechanism lock.

22 Claims, 10 Drawing Sheets

(56) References Cited

U.S. PATENT DOCUMENTS

| | | |
|---|---|---|
| 4,121,893 A | 10/1978 | Morissette |
| 4,136,962 A | 1/1979 | Brouwer et al. |
| 4,221,483 A | 9/1980 | Rando |
| 4,570,877 A * | 2/1986 | Oishi et al. ............... 242/345.3 |
| 4,578,870 A | 4/1986 | Cooke |
| 4,767,208 A | 8/1988 | Cain et al. |
| 4,836,671 A | 6/1989 | Bautista |
| 4,852,265 A | 8/1989 | Rando et al. |
| 4,912,851 A | 4/1990 | Rando et al. |
| 4,993,161 A | 2/1991 | Borkovitz |
| 5,095,386 A | 3/1992 | Scheibengraber |
| 5,108,177 A | 4/1992 | Middleton |
| 5,182,863 A | 2/1993 | Rando |
| 5,287,627 A | 2/1994 | Rando |
| 5,367,779 A | 11/1994 | Lee |
| 5,459,932 A | 10/1995 | Rando et al. |
| 5,524,352 A | 6/1996 | Rando et al. |
| 5,539,990 A | 7/1996 | Le |
| 5,541,727 A | 7/1996 | Rando et al. |
| 5,552,886 A | 9/1996 | Kitajima et al. |
| 5,584,458 A | 12/1996 | Rando |
| 5,619,802 A | 4/1997 | Rando et al. |
| 5,621,975 A | 4/1997 | Rando |
| 5,661,892 A | 9/1997 | Catania et al. |
| 5,689,330 A | 11/1997 | Gerard et al. |
| 5,732,924 A | 3/1998 | Hegarty et al. |
| 5,733,061 A | 3/1998 | Child |
| 5,782,003 A | 7/1998 | Bozzo |
| 5,790,248 A | 8/1998 | Ammann |
| 5,953,108 A | 9/1999 | Falb et al. |
| 6,005,719 A | 12/1999 | Rando |
| 6,007,216 A | 12/1999 | Donnelly |
| 6,009,630 A | 1/2000 | Rando |
| 6,014,211 A | 1/2000 | Middleton et al. |
| 6,017,010 A | 1/2000 | Cui |
| 6,105,794 A | 8/2000 | Bauer |
| 6,128,326 A | 10/2000 | Kousek et al. |
| 6,202,312 B1 | 3/2001 | Rando |
| 6,256,895 B1 | 7/2001 | Akers |
| 6,360,446 B1 | 3/2002 | Bijawat et al. |
| 6,384,420 B1 | 5/2002 | Bozzo |
| 6,449,856 B1 | 9/2002 | Matsumoto et al. |
| 6,536,122 B2 | 3/2003 | Tamamura |
| 6,546,636 B2 | 4/2003 | Tamamura |
| 6,579,017 B2 | 6/2003 | Wei |
| 6,588,115 B1 | 7/2003 | Dong |
| 6,598,304 B2 | 7/2003 | Akers |
| 6,606,798 B2 | 8/2003 | El-Katcha et al. |
| 6,694,629 B2 | 2/2004 | Goodrich |
| 6,763,595 B1 | 7/2004 | Hersey |
| 6,763,596 B1 | 7/2004 | Puri et al. |
| 6,804,892 B1 | 10/2004 | Yung et al. |
| 6,848,188 B2 | 2/2005 | Tacklind et al. |
| 6,892,463 B1 | 5/2005 | Pu |
| 6,914,930 B2 | 7/2005 | Raskin et al. |
| 6,915,583 B2 | 7/2005 | El-Katcha et al. |
| 6,941,665 B1 | 9/2005 | Budrow et al. |
| 6,964,106 B2 | 11/2005 | Sergyeyenko et al. |
| 7,027,480 B2 | 4/2006 | Marshall et al. |
| 7,031,367 B2 | 4/2006 | Marshall et al. |
| 7,059,057 B2 | 6/2006 | Raskin et al. |
| 7,069,661 B2 | 7/2006 | Liao |
| 7,100,293 B2 | 9/2006 | Kahle |
| 7,116,697 B2 | 10/2006 | Dong |
| 7,134,211 B2 | 11/2006 | Bascom et al. |
| 7,134,212 B2 | 11/2006 | Marshall et al. |
| 7,174,648 B2 | 2/2007 | Long et al. |
| 7,178,250 B2 | 2/2007 | Nash et al. |
| 7,191,532 B2 | 3/2007 | Long et al. |
| 7,204,027 B2 | 4/2007 | Tacklind |
| 7,237,341 B2 | 7/2007 | Murray |
| 7,260,895 B2 | 8/2007 | Long et al. |
| 7,287,336 B1 | 10/2007 | Goodrich |
| 7,310,886 B2 | 12/2007 | Bascom et al. |
| 7,310,887 B2 | 12/2007 | Nash et al. |
| 7,316,073 B2 | 1/2008 | Murray |
| 7,392,591 B2 | 7/2008 | Milligan et al. |
| 7,392,592 B2 | 7/2008 | Bublitz et al. |
| 7,454,839 B2 * | 11/2008 | Della Bona ............ F16M 11/14 33/281 |
| 7,469,481 B2 | 12/2008 | Nash et al. |
| 7,497,018 B2 | 3/2009 | Hersey et al. |
| 7,513,052 B2 | 4/2009 | Milligan et al. |
| 7,520,062 B2 * | 4/2009 | Munroe ................ G01C 15/004 33/286 |
| 7,523,558 B2 | 4/2009 | Milligan et al. |
| 7,571,546 B1 | 8/2009 | Sergyeyenko et al. |
| 7,635,119 B1 | 12/2009 | Patel |
| 7,803,059 B2 | 9/2010 | Zhang |
| 7,926,774 B1 | 4/2011 | Wilson |
| 7,980,521 B2 | 7/2011 | Harr et al. |
| 7,992,312 B2 | 8/2011 | Krasko |
| 8,006,394 B2 | 8/2011 | Tippett et al. |
| 8,011,105 B2 | 9/2011 | Wilson et al. |
| 8,077,328 B2 | 12/2011 | Scheibengraber et al. |
| 8,167,259 B2 | 5/2012 | Spang, Jr. et al. |
| 8,171,649 B2 | 5/2012 | Kallabis et al. |
| 8,267,361 B1 | 9/2012 | Dordick |
| 2001/0037579 A1 | 11/2001 | Akers |
| 2003/0106226 A1 | 6/2003 | Tacklind et al. |
| 2004/0078989 A1 | 4/2004 | Fai et al. |
| 2005/0155237 A1 | 7/2005 | Lee |
| 2005/0172502 A1 * | 8/2005 | Sergyeyenko ....... G01C 15/004 33/286 |
| 2005/0204570 A1 * | 9/2005 | Bascom ............... G01C 15/002 33/286 |
| 2005/0268474 A1 * | 12/2005 | Liao ............................... 33/285 |
| 2006/0007964 A1 | 1/2006 | Lin |
| 2006/0013278 A1 | 1/2006 | Raskin et al. |
| 2007/0109783 A1 * | 5/2007 | Wilson et al. ................ 362/259 |
| 2007/0152116 A1 | 7/2007 | Madsen |
| 2007/0204474 A1 | 9/2007 | Lin |
| 2007/0271800 A1 * | 11/2007 | Hersey ................ G01C 15/004 33/286 |
| 2010/0276554 A1 | 11/2010 | Steffen |
| 2010/0276555 A1 | 11/2010 | Steffen et al. |
| 2010/0299988 A1 | 12/2010 | Robinson |
| 2012/0090184 A1 * | 4/2012 | Zimmermann ...... G01C 15/004 33/291 |
| 2013/0340268 A1 * | 12/2013 | Gulunav ............. G01C 15/004 33/291 |
| 2014/0352161 A1 * | 12/2014 | Ranieri ................ G01C 15/004 33/291 |

FOREIGN PATENT DOCUMENTS

| | | |
|---|---|---|
| DE | 7512321 | 9/1975 |
| DE | 2831320 | 2/1979 |
| DE | 9307359 | 7/1993 |
| DE | 9415330 | 12/1994 |
| DE | 20020654 | 4/2002 |
| DE | 10335207 | 2/2005 |
| DE | 102007039343 | 2/2009 |
| DE | 202009006243 | 7/2009 |
| DE | 102008041597 | 3/2010 |
| DE | 102008041782 | 3/2010 |
| DE | 20 2011 004651 U1 | 11/2011 |
| EP | 0 102 221 | 3/1984 |
| EP | 0 417 566 A1 | 3/1991 |
| EP | 0 786 644 | 7/1997 |
| EP | 0 819 911 | 1/1998 |
| EP | 1 519 147 | 3/2005 |
| EP | 1 939 587 | 7/2008 |
| JP | 11-325893 | 11/1999 |
| RU | 2442960 C1 * | 2/2012 .......... G01C 15/004 |
| WO | WO 98/11407 | 3/1998 |
| WO | WO 2005/008179 | 1/2005 |
| WO | WO 2007/140323 | 12/2007 |
| WO | WO 2008/024335 | 2/2008 |

OTHER PUBLICATIONS

Bosch MM2 Arbeitsklemme, Jun. 1, 2011, Amazon.de, retrieved from the internet: Mar. 25, 2015. <URL: http://www.amazon.de/

(56) References Cited

OTHER PUBLICATIONS

Bosch-MM2-Arbeitsklemme/dp/B0053PVH6I>.*
Bosch Quigo Self-Levelling Cross-Line Laser Level. [online]. [retrieved on Jun. 19, 2013]. Retrieved from the Internet: <URL: http://www.amazon.co.uk/Bosch-Quigo-Self-Levelling-Cross-Line-Laser/dp/B0042RU82W.
Self-Leveling Cross-Line Laser. [online]. Skil Tools, Robert Bosch Tool Corporation [retrieved on Jun. 19, 2013]. Retrieved from the Internet: <URL: http://www.skiltools.com/Tools/Pages/ProductDetail.aspx?model=8201-CL.
Topcon Holder 6 Laser Detector Bracket, Receiver Clamp, LS-50, LS-70, LS-80. [online]. [retrieved on Jun. 19, 2013]. Retrieved from the Internet: <URL: http://www.ebay.com/itm/ws/eBayISAPI.dll?ViewItem&rt=nc&item=110905004350&si=GBqAoXiqlKzZybdyPgKAlon%2Fvtc%3D&print=all&category=63942.
Johnson Level One-Sided Laser Detector with Clamp 40-6700. [online]. [retrieved on Jun. 19, 2013]. Retrieved from the Internet: <URL: http://www.engineersupply.com/Johnson-Level-One-Sided-Laser-Detector-with-Clamp-40-6700.aspx?gdftrk=gdfV22645_a_7c983_a_7c4620_a_7cES1630&gclid=CLHKwaSOr7MCFQWe4AodABQAGA.
Extended European Search Report issued in European Patent Application No. EP 14170470.0, dated Oct. 28, 2014.

* cited by examiner

LASER LEVEL SYSTEM

BACKGROUND OF THE INVENTION

1. Field of the Invention

The present disclosure relates to a laser level system.

2. Description of Related Art

Laser level systems are well known. Laser levels are sometimes used in a "manual" (not self-leveling) mode to project lines other than plumb and vertical for various construction needs, as shown, for example, in U.S. Pat. No. 6,763,595.

Laser levels may be attached to mounting brackets so as to orient the level in a predetermined position relative to an object to which the mounting bracket is mounted.

SUMMARY OF EMBODIMENTS OF THE INVENTION

In various conventional self-leveling laser levels with a manual (e.g., non-self-leveling) mode, the "manual" mode is indicated by a separate indicator on the housing of the laser level. The separate indicator on the housing is easily missed by the user while using the laser level. One or more embodiments of the present disclosure provide a manual mode indication via a flashing pattern of the projected light beam.

One aspect of the present disclosure relates to a laser level system. The laser level system comprises a laser level and/or other components. The laser level includes a housing, a first quick connect mount, a second quick connect mount, at least one laser generator, a self-leveling mechanism, and/or other components. The housing includes a plurality of external surfaces. The first quick connect mount is supported by the housing and disposed in a first orientation. The first quick connect mount is configured to removably engage a quick connect tool mounting bracket in the first orientation. The second quick connect mount is supported by the housing and disposed in a second orientation that differs from the first orientation. The second quick connect mount is configured to removably engage the quick connect tool mounting bracket in the second orientation. The at least one laser generator is supported by the housing and configured to emit at least one laser beam. In some embodiments, the system includes one or more optical components configured to convert the at least one laser beam into a horizontal fan beam and a vertical fan beam that intersects the horizontal fan beam. The self-leveling mechanism is supported by the housing and configured to orient the at least one laser beam in a predetermined direction relative to gravity.

In some embodiments, the first quick connect mount comprises a first slot in the housing. The second quick connect mount comprises a second slot in the housing. The first quick connect mount may be disposed on an opposite side of the housing from the second quick connect mount. In some embodiments, the system may include a third quick connect mount supported by the housing and disposed in a third orientation that differs from the first and second orientations. The third quick connect mount is configured to removably engage the quick connect tool mounting bracket in the third orientation. The first, second, and third orientations may be generally orthogonal to each other.

In some embodiments, the system includes a quick connect tool mounting bracket. The quick tool mounting bracket comprises a clamp, a quick connect portion, and/or other components. The clamp is configured to removably clamp to an external base support. The quick connect portion is connected to the clamp. The quick connect portion is configured to alternatively and removably engage either of the first and second quick connect mounts so as to connect the housing to the quick connect tool mounting bracket in either the first or second orientation. In some embodiments, the clamp is connected to the quick connect portion via first and second serial ball-and-socket mechanisms. The balls of the first and second ball-and-socket mechanisms may be spaced from each other.

In some embodiments, the quick connect portion comprises one of a slot and a protrusion with an enlarged head. The first and second quick connect mounts each comprise the other of the slot and the protrusion with the enlarged head. The slot and protrusion are configured to releasably engage each other so as to provide a quick connect connection between the laser level and the quick connect tool mounting bracket.

Another aspect of the present disclosure relates to a quick connect tool mounting bracket. The quick connect tool mounting bracket comprises a clamp, an externally threaded post, a quick connect adapter, and/or other components. The clamp is configured to removably clamp to an external base support. The externally threaded post is connected to the clamp. The externally threaded post defines a standard camera mount configured to mount to an internally threaded mount of a camera. The quick connect adapter has an internally threaded mount configured to threadingly mate with the externally threaded post. The quick connect adapter has a quick connect portion that is configured to removably engage a quick connect mount of a tool so as to connect the tool to the quick connect tool mounting bracket in a first orientation.

In some embodiments, the system may include a tool having at least one quick connect mount configured to engage the quick connect portion. In some embodiments, the tool is a laser level. The tool may comprise an internally threaded mount configured to threadingly mate with the externally threaded post. In some embodiments, the quick connect portion of the quick connect adapter comprises a protrusion with a distal head that is enlarged relative to a proximal neck.

Yet another aspect of the present disclosure relates to a laser level system. The laser level system comprises a housing, at least one laser generator, a self-leveling mechanism, a controller, and/or other components. The housing includes a plurality of external surfaces. The at least one laser generator is supported by the housing and configured to emit at least one laser beam. The self-leveling mechanism is supported by the housing and configured to orient the at least one laser beam in a predetermined direction relative to gravity. The controller is configured to control the self-leveling mechanism and the at least one laser generator. The controller has user-selectable modes including an off mode, a self-leveling mode, and a manual mode. In the off mode the at least one laser generator is off. In the self-leveling mode, responsive to the housing being tilted to less than or equal to a tilt angle threshold level, the at least one laser generator is on and the self-leveling mechanism orients the at least one laser beam in the predetermined direction relative to gravity. Responsive to the housing being tilted past the tilt angle threshold level, the controller is configured to provide a visually perceptible out-of-level indication. In the manual mode the controller is configured to sequentially turn the at least one laser generator on and off repetitively to provide a visually perceptible manual mode indication. The out-of-level indication is different than the visually perceptible manual mode indication.

In some embodiments, the laser level system includes a self-leveling mechanism lock. The self-leveling mechanism lock has an ON state that deactivates the self-leveling mechanism and locks an orientation of the at least one laser beam into a locked position relative to the housing. The self-leveling mechanism lock locks an orientation of the at least one laser beam regardless of the orientation of the housing relative to gravity. The controller is configured to place the self-leveling mechanism lock in its ON state when in the manual mode. In some embodiments, the self-leveling mechanism comprises a pendulum pendulously supported by the housing. The self-leveling mechanism lock may prevent pendulous movement of the pendulum relative to the housing when the self-leveling mechanism lock is in its ON state. In some embodiments, the controller is configured to place the self-leveling mechanism lock in its ON state when in the off mode. In some embodiments, when the controller is in the manual mode such that the self-leveling mechanism lock is in its ON state, at least one of the at least one laser beams is projected from the housing in a direction that is parallel to a reference surface defined by the housing.

In some embodiments, such as when the self-leveling mechanism comprises a pendulum pendulously supported by the housing, the pendulum pendulously supports the laser generator. In some embodiments, the controller is configured such that when in the self-leveling mode and the housing is tilted to less than or equal to the tilt angle threshold, the controller causes the laser projector to continuously project the at least one laser beam. In some embodiments, the visually perceptible out-of-level indication comprises a sequential turning on and off of the at least one laser generator repetitively in a repetitive on/off pattern that differs from a repetitive on/off pattern used to provide the visually perceptible manual mode indication. In some embodiments, the at least one laser generator is on a greater percentage of the time when in the manual mode than during the out-of-level indication.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranged, 2-10, 1-9, 3-9, etc.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION OF EXEMPLARY EMBODIMENTS OF THE INVENTION

Figure 1:
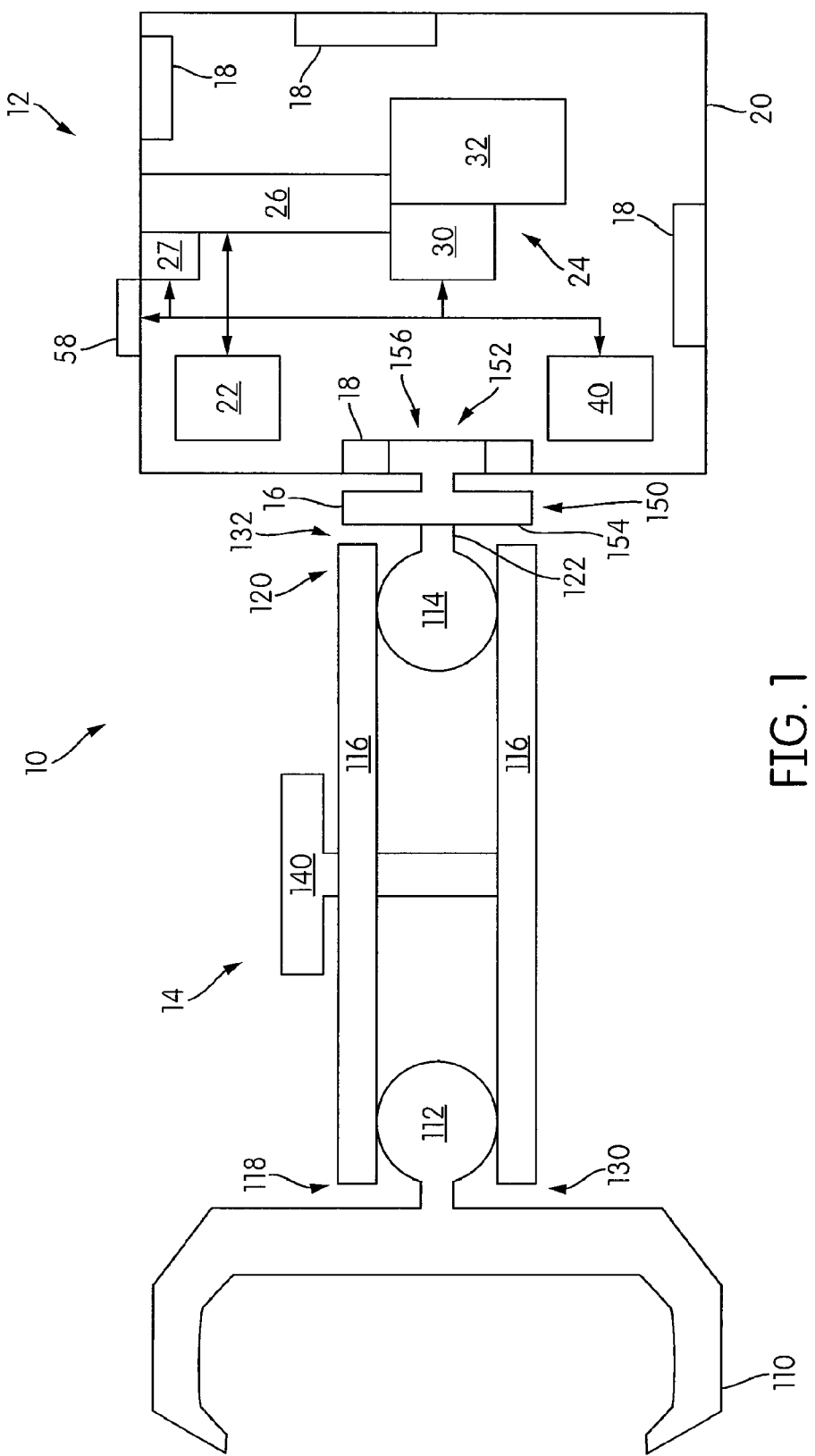
FIG. 1 illustrates a laser level system.

FIG. 1 illustrates a laser level system 10. Laser level system 10 includes a laser level 12, a quick connect tool mounting bracket 14, and/or other components. Laser level 12 may be mounted to quick connect tool mounting bracket 14 in one or more different orientations via a quick connect adapter 16. Adapter 16 may be removably coupled with bracket 14 and any of a plurality of quick connect mounts 18 formed in one or more external surfaces a housing 20 of laser level 12. One or more laser beams generated by laser level 12 may be controlled via a controller 22 to indicate whether laser level 12 is in a "manual" mode, whether laser level 12 is in a "self-leveling" mode, and/or whether laser level 12 is "out of level" while in the "self-leveling" mode.

Bracket 14 may be coupled with an external base and adjusted to allow a user increased flexibility when positioning laser level 12 in a work area. Adapter 16 may be quickly coupled with bracket 14 and/or laser level 12. Laser level 12 may be removably coupled with bracket 14 in one or more different orientations via adapter 16 and quick connect mounts 18. Laser level 12 may be easily coupled with and/or removed from bracket 14 by sliding, for example, quick connect adapter 16 within mounts 18. In some embodiments, quick connect mounts 18 may be and/or include quick connect slots and/or other quick connect components. Controller 22 may control the one or more laser beams to provide visual cues within the projected laser lines that indicate the current mode of laser level 12 to reduce the risk of a user not realizing the laser is in the "manual" mode and/or provide other indications. Controller 22 may control the one or more laser beams to provide visual cues within the projected laser lines that are not bothersome to the user. For example, controller 22 may cause the introduction of a second and/or multiple longer "on" times between laser "flashes" that provide an indication of the "manual" mode to the user initially, while avoiding frequent unwanted "flashes" when used purposely in the "manual" mode over a longer period of time. In some embodiments, laser level system 10 may include, for example, one or more components of the system described in U.S. patent application Ser. No. 11/585,931 filed Oct. 25, 2006, entitled, "Light-Plane Projecting Apparatus and Lens", which is incorporated herein by reference.

Laser level 12 includes a laser projection device 24, a self-leveling mechanism 26, controller 22, housing 20, quick connect mounts 18, a power source 40, and/or other components.

Laser projection device 24 is configured to generate and/or project a laser beam outwardly from housing 20. Laser projection device 24 includes one or more laser generators 30 such as laser diodes, one or more optical components 32 (e.g., lens(es) and/or mirror(s)), and/or other components.

Laser generator 30 (e.g., laser diode(s)) is configured to emit a laser beam. In some embodiments, laser projection device 24 includes a single laser diode 30. In some embodiments, laser projection device 24 includes two or more laser diodes. Laser generator 30 may produce visible light having a predetermined wavelength (e.g., in the range of 400-700 nm). Laser generator 30 may produce a red laser beam, a green laser beam, and/or laser beams of other colors and/or wavelengths. In some embodiments, laser generator 30 may have a predetermined output power and/or input voltage. For example, the output power may be between about 0.5 and 20 mW. The input voltage may be between about 2.7 volts and about 7.0 volts.

In some embodiments, the laser beam(s) projected out of housing 20 comprise one or more point-source beams that generate points on the objects they hit. Such point-source beams may be oriented orthogonally to each other (e.g., beam(s) projecting in any of four orthogonal horizontal directions, a beam projecting vertically upwardly, and/or a beam projecting vertically downwardly).

Figure 2:
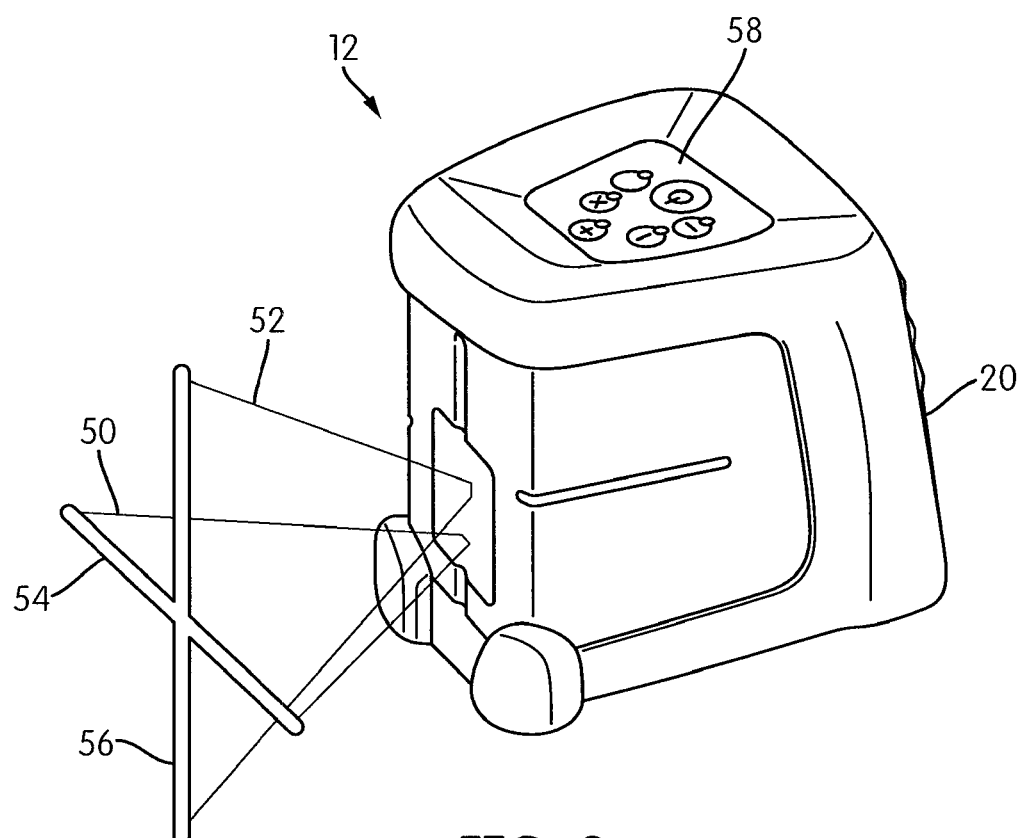
FIG. 2 illustrates a laser level projecting two substantially perpendicular laser light planes.
Figure 7:
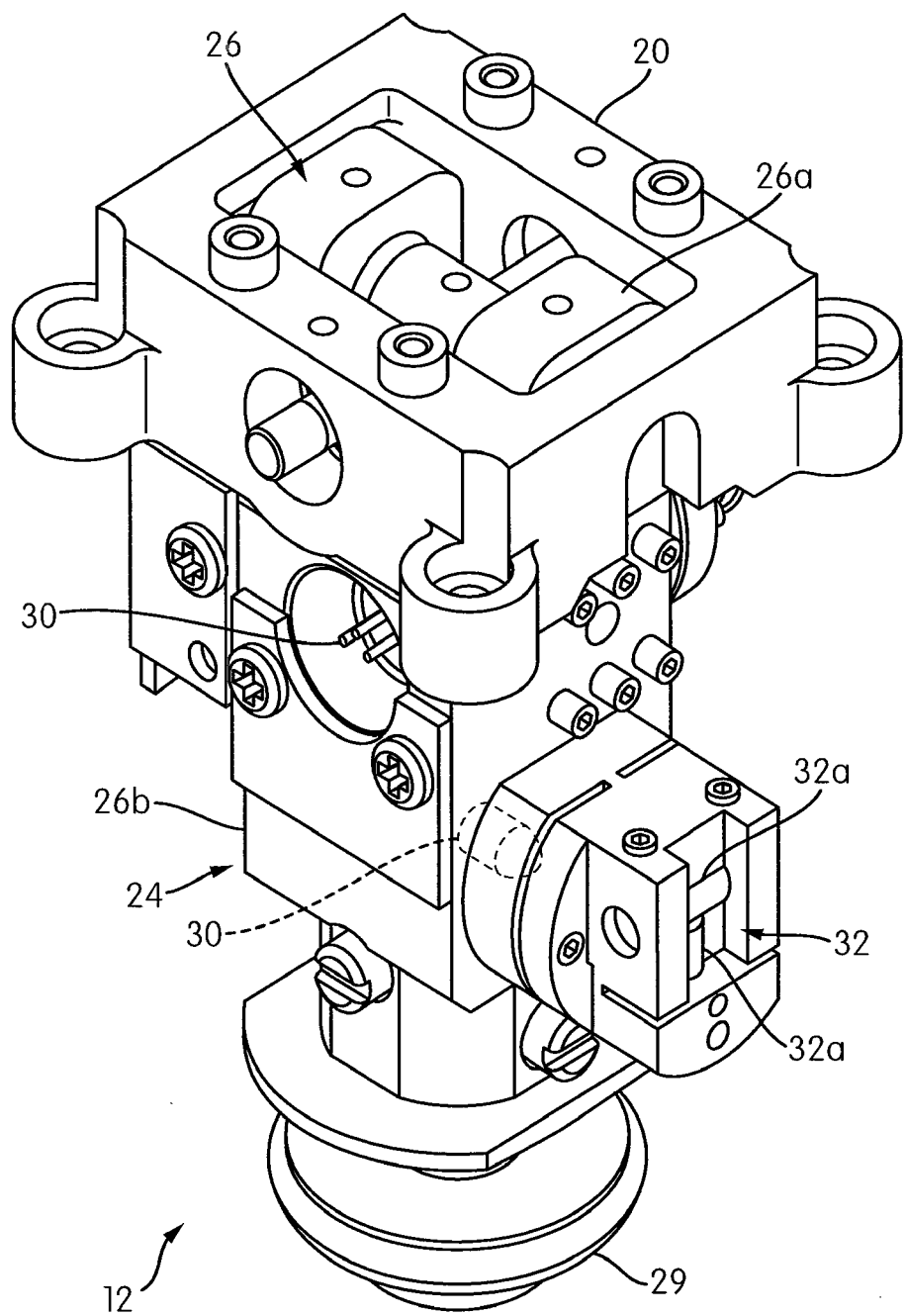
FIG. 7 is a perspective view of internal components of the laser level system of FIG. 1.

In some embodiments, the laser beam(s) are converted into fan beams (e.g., planar beams/light planes) via optical components 32 so as to project light lines onto the objects they intersect. Optical components 32 may include lenses, collimators (e.g., collimating lenses, collimating tube), apertures, and/or other optical components. Optical components 32 may include cylindrical lenses 32a and/or non-cylindrical lenses. In some embodiments, for example as shown in FIG. 7, one or more optical components 32 may include orthogonally oriented rod/cylinder lenses 32a that convert a point-source (i.e., linear) beam from a single diode 30 into two orthogonal planar (e.g., fan-shaped) beams that project a cross shape (e.g., a "+" shape) onto an object such as a wall. The point-source beam from the diode 30 is collimated and then generally directed to an intersection between the two cylinder lenses 32a, without previously being split. The portions of the point-source/linear beam that impinge upon the respective lenses 32a are converted into respective orthogonal fan-shaped planar beams 50, 52, as shown in FIG. 2. Alternatively, discrete laser generators 30 may be used for each planar beam (e.g., as shown in U.S. Pat. No. 6,763,595, the contents of which are hereby incorporated herein by reference). The output beams may comprise two, three, or more orthogonal planar beams. Such point-source and planar beam generating laser levels are well known in the art (e.g., as shown in U.S. Pat. Nos. 6,763,595, 6,763, 596, 5,539,990).

Self-leveling mechanism 26 is supported by housing 20 and configured to orient the laser beam(s) in a predetermined direction relative to gravity. Self-leveling mechanism 26 may comprise any suitable self-leveling mechanism known in the art (e.g., a pendulum 26b that pendulously supports the laser generator(s) 30 (e.g., laser diode(s)) and/or one or more of the optical components 32, a motorized self-leveling mechanism that senses levelness and responsively tilts a portion of the level). In the embodiment illustrated in FIG. 7, self-leveling mechanism 26 comprises a pendulum 26b that is mounted to housing 20 and supports laser projection device 24 (including laser generator(s) 30 and optical components 32) so as to pendulously support laser projection device 24 from housing 20. As shown in FIG. 7, self-leveling mechanism 26 may suspend the pendulum 26b (including components of laser projection device 24 supported by the pendulum 26b) from housing 20 by a gimbal 26a and/or other pendulous connection that extends between the housing 20 and pendulum 26b. In some embodiments, for example as shown in FIG. 7, the pendulum 26b holds laser generator(s) 30, at least one of one or more optical components 32, and/or other components. Self-leveling mechanism 26 is configured to orient laser generator(s) 30 and/or one or more optical components 32 such that the one or more laser light planes are projected at predetermined angles relative to gravity (e.g., horizontally and vertically). Housing 20 is configured to contain laser projection device 24 and self-leveling mechanism 26 such that at least a portion of laser projection device 24 moves pendulously within housing 20 responsive to housing 20 being tilted by a user. In some embodiments, self-leveling mechanism 26 may include a magnetic damper 29 (see FIG. 7). Such self-leveling mechanisms are well-known in the art (e.g., as shown in U.S. Pat. Nos. 6,763,595, 6,763,596, 5,539,990).

By way of a non-limiting example, FIG. 2 illustrates laser level 12 projecting two substantially perpendicular laser light planes 50, 52. Projected laser light planes 50 and 52 form illuminated lines 54 and 56 on a target surface (e.g., a nearby wall). In some embodiments, laser level 12 may project only one of laser light planes 50 or 52. In some embodiments, laser level 12 may include a user interface 58. User interface 58 is configured to provide an interface between laser level 12 and users through which the users may provide information to and receive information from system 10. For example, a user may specify one or more laser level operating modes (e.g., "manual" and/or "self-leveling") via user interface 58. Examples of interface devices suitable for inclusion in user interface 58 comprise a keypad, buttons, switches, knobs, levers, a display screen, a touch screen, indicator lights, and/or other interface devices. In some embodiments, user interface 58 is provided integrally with housing 20.

Returning to FIG. 1, controller 22 is configured to control self-leveling mechanism 26, laser projection device 24, and/or other components to operate in one or more modes that are selectable by the user. In some embodiments, the one or more modes are selectable by the user via a user interface (e.g., user interface 58, a multi-position mode changing switch mounted to housing 20 that is part of user interface 58 and/or replaces user interface 58, and/or other user interfaces). The one or more modes comprise an "off" mode, a "self-leveling" mode, a "manual" mode, and/or other modes.

Figure 8A:
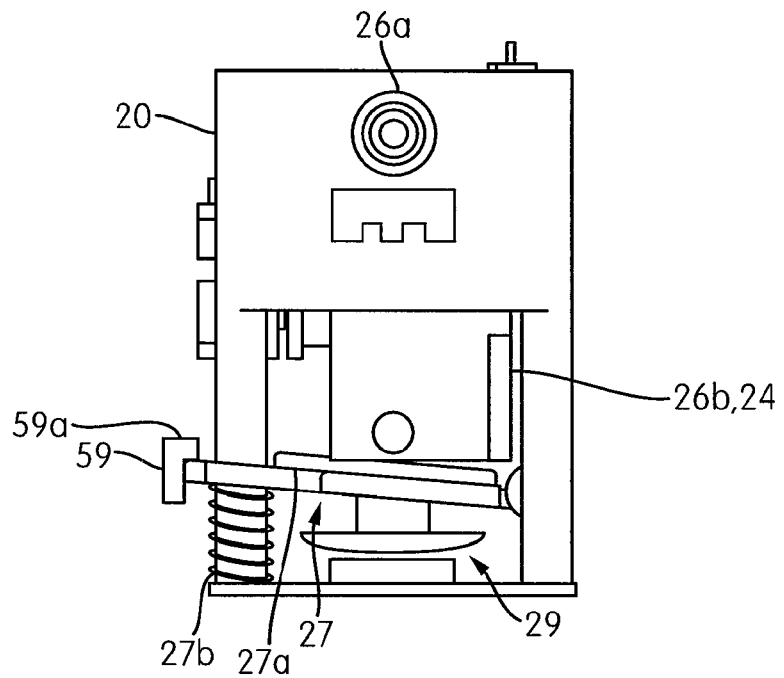
FIG. 8(a) is a side diagrammatic view of the internal components of the laser level system of FIG. 1 with a self-leveling mechanism lock in an ON state.
Figure 8B:
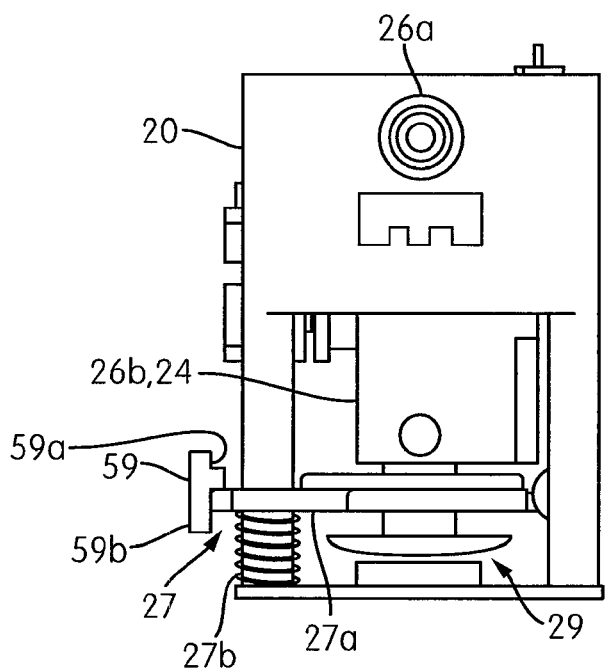
FIG. 8(b) is a side diagrammatic view of the internal components of the laser level system of FIG. 1 with a self-leveling mechanism lock in an OFF state.

As shown in FIGS. 8(a) and 8(b), laser level 12 includes a self-leveling mechanism lock 27 having an ON state (shown in FIG. 8(a)) that deactivates self-leveling mechanism 26 and locks an orientation of the laser light beams/planes (e.g., laser light planes 50, 52 shown in FIG. 2) and laser projection device 24 into a locked position relative to the housing 20, regardless of the orientation of housing 20 relative to gravity. The orientation may be defined even if the beams/planes 50, 52 are off. In contrast, when self-leveling mechanism lock 27 is in an OFF state (shown in FIG. 8(b)), self-leveling mechanism 26 self-levels. In embodiments in which the self-leveling mechanism 26 comprises a pendulum 26b, placing lock 27 in the ON state locks a position of the pendulum 26b relative to housing 20, while placing lock 27 in the OFF state (shown in FIG. 8(b)) permits the pendulum 26b to move relative to housing 20.

In the embodiment illustrated in FIG. 7, the lock 27 comprises a plate 27a or other structure that is movably (e.g., pivotally or linearly) connected to the housing 20. A spring 27b extends between the housing 20 and the plate 27a to bias the plate 27a upwardly into the ON state of the lock 27 (shown in FIG. 8(a)). In the ON state, the plate 27a pushes upwardly against the pendulum 26b to prevent or discourage the pendulum 26b from moving. Conversely, when the plate 27a is pushed downwardly against the biasing force of the spring 27b, the plate 27a disengages from the pendulum 26b, thereby permitting the pendulum 26b to level itself to facilitate operation of the self-leveling mechanism 26.

Alternatively, the lock 27 may comprise any suitable lock for deactivating self-leveling mechanism 26 so as to lock the orientation of the laser beams/planes relative to housing 20 (e.g., a hook, a latch, a clamp, a pin, a bolt, a magnetic lock, and/or other restraint mechanisms). U.S. Pat. Nos. 6,763,596, 6,009,630, and 6,536,122, and PCT Publication No. WO98/11407 (all of which are incorporated herein by reference in their entirety) disclose a variety of laser level pendulum locks that may be used as self-leveling mechanism lock 27. However, those of ordinary skill in the art will recognize that a variety of other locking mechanisms may alternatively be used without deviating from the scope of the present invention. Moreover, lock 27 may be omitted entirely without deviating from the scope of the present invention.

According to various embodiments, turning lock 27 ON locks an orientation of the laser beams/planes 50, 52 (FIG. 2) into a locked position relative to external surfaces of housing 20, regardless of the orientation of housing 20 relative to gravity. For example, beam/plane 50 may be locked so as to be parallel to a bottom surface 61 (shown in FIG. 3 described below) of housing 20 so as to project a plane at a set offset from the object on which the bottom surface 61 is resting against. Beams/planes 50, 52 may be parallel to or orthogonal to different ones of the external surfaces (e.g., four sides, bottom, and top surfaces) of housing 20. Lock 27 may lock the pendulum 26b of self-leveling mechanism 26 at or near a center of an arc of the pendulum 26b of self-leveling mechanism 26.

According to various embodiments, lock 27 may be activated by controller 22. According to various embodiments, physical movement of a mode switch 59 (shown in FIGS. 3 and 8(a)-(b) and described below) into the OFF or manual modes may mechanically activate lock 27 (ON state), and movement of the mode switch 59 into the self-leveling mode may deactivate lock 27 (OFF state). In particular, as shown in FIGS. 8(a) and 8(b), the switch 59 includes a cam 59a that abuts the plate 27a and manually pushes the plate 27a downwardly into the OFF state of the lock 27 when the switch 59 is moved into its off or manual modes (shown in FIG. 8(b)). Conversely, movement of the switch 59 into the self-leveling mode permits the plate 27a to push upwardly against the pendulum 26b such that the lock 27 is in its ON state.

Movement of the switch 59 between its different modes moves the switch 59 into and out of the page as shown in FIGS. 8(a) and (b). The cam surface of the cam 59a angles upwardly/downwardly in the direction into and out of the page as shown in FIGS. 8(a) and 8(b) to correspondingly turn the lock 27 ON or OFF in response to such movement of the switch 59 between the modes.

Alternatively, controller 22 may automatically (e.g., electronically, electromagnetically, etc.) turn lock 27 ON when the level 12 is in the off or manual mode, and turn lock 27 OFF when in the self-leveling mode. Placing lock 27 in the ON state when laser level 12 is off may protect the self-leveling mechanism 26 during transportation by limiting or preventing jostling of the pendulum 26b relative to housing 20.

In the "off" mode, self-leveling mechanism 26 is in a fixed position relative to housing 20. Laser projection device 24 does not generate and/or project a laser beam.

In the "self-leveling" mode, responsive to housing 20 being tilted relative to gravity to less than or equal to a tilt angle threshold level, self-leveling mechanism 26 moves to self-level laser projection device 24. Controller 22 causes laser projection device 24 to generate and project the laser beam in a first laser beam pattern. In some embodiments, controller 22 is configured such that causing laser projection device 24 to generate and project the laser beam in the first laser beam pattern includes generating and projecting a continuous laser beam. In some embodiments, the tilt angle threshold level may be determined at manufacture, may be determined based on information entered and/or selected by a user via user interface 58, and/or may be determined based on other information. By way of a non-limiting example, the tilt angle threshold level may be determined to be about 4, 5, 6, 7, 8, 9, and/or 10 degrees during manufacture. Responsive to housing 20 being tilted past the tilt angle threshold level (e.g., "out of level"), controller 22 causes laser projection device 24 to generate and project the laser beam in a second laser beam pattern. In some embodiments, controller 22 is configured such that causing laser projection device 24 to generate and project the laser beam in the second laser beam pattern includes generating and projecting a flashing laser beam.

In addition to or in the alternative to the second flashing pattern, when in self-leveling mode, laser level 12 may provide any other suitable indication of "out of level" (e.g., an audible signal, an indicator light that is separate from the laser generator 30, turning the laser generator 30 off entirely) without deviating from the scope of the present invention. Indeed, an out of level indicator may be eliminated without deviating from the scope of the invention.

In the "manual" mode, self-leveling mechanism 26 is in the fixed position relative to housing 20. Laser projection device 24 is configured to generate and project the laser beam in a third laser beam pattern. In some embodiments, controller 22 is configured such that causing laser generator 30 to generate and project the laser beam in the third laser beam pattern includes generating and projecting a flashing beam and then a continuous beam. In some embodiments, controller 22 is configured such that the laser beam flashes for a predetermined amount of time at a predetermined frequency. In some embodiments, causing laser generator 30 to generate and project the laser beam in the third laser beam pattern includes generating and projecting repeating cycles of a flashing beam followed by a continuous beam. In some embodiments, the time period between flashing portions of the third laser beam pattern may be varied by controller 22. In some embodiments, the time period between flashing portions of the third laser beam pattern may increase over time during use of laser level 12 in the "manual" mode. For example, when first set in the "manual" mode, controller 22 may cause the beam to blink and/or flash for a first period of time and then remain constant for a second period of time. After the second period of time, the beam may be controlled to blink and/or flash again for a third period of time that is the same as the first period of time. According to various embodiments, the laser beam is on for a significant percentage of the time-based pattern (e.g., long on time, short off time). According to various embodiments, the third pattern differs from the first and second patterns to help indicate to the level's user that the level is in the manual mode, rather than a self-leveling mode. According to various embodiments, the laser generator is on for a greater percentage of the time when in the third pattern than when in the second pattern.

In some embodiments, controller 22 is configured such that causing laser projection device 24 to generate and project the laser beam in one or more of the first laser beam pattern, the second laser beam pattern, the third laser beam pattern, and/or other laser beam patterns includes causing laser projection device 24 to generate and project the laser beam with one or more laser beam colors in addition to and/or instead of flashing patterns. The differently colored laser beams may be projected on a target surface and indicate the operational mode of laser level 12 to the user. In some embodiments, controller 22 is configured such that individual laser colors correspond to individual ones of the first laser beam pattern, the second laser beam pattern, the third laser beam pattern, and/or other laser beam patterns. For example, a green laser beam line may correspond to the first laser beam pattern and indicate that laser level 12 is in the "self-leveling" mode and not "out of level". A red laser beam line may correspond to the second laser beam pattern and indicate that housing 20 has been tilted "out of level". A green dashed line may correspond to the third laser beam pattern and indicate that laser level 12 is in the "manual" mode.

Housing 20 is configured to house laser generator (diode(s)) 30, optical components 32, controller 22, self-leveling mechanism 26, lock 27, power source 40, and/or other components. Housing 20 is configured to house the components of laser level 12 such that laser level 12 is hand-held and/or portable. In some embodiments, housing 20 is generally shaped as a rectangular prism. A rectangular prism describes a three-dimensional shape formed by six rectangular sides. Being generally shaped as a rectangular prism may describe a three-dimensional shape formed by rectangular and/or near-rectangular sides with one or more of the sides having rounded and/or beveled corners, rounded and/or beveled edges, opposing surface that are not parallel, adjacent surfaces that are not orthogonal, and/or other geometric variances from a rectangular prism. Housing 20 may include features that extend from one or more of the surfaces, and/or are formed in one or more of the surfaces and still be generally shaped as a rectangular prism. For example, for the purposes of this disclosure, a housing body with an oval surface may be considered as being generally shaped as a rectangular prism. Surface edges may have an arcuate shape. Transitions between surfaces may have an arcuate shape. As another example, housing 20 may form a handle configured to be grasped by the user and still be generally shaped as a rectangular prism. As a third example, the shape of laser level 12 shown in FIG. 2 may be considered to be generally shaped as a rectangular prism.

Figure 3:
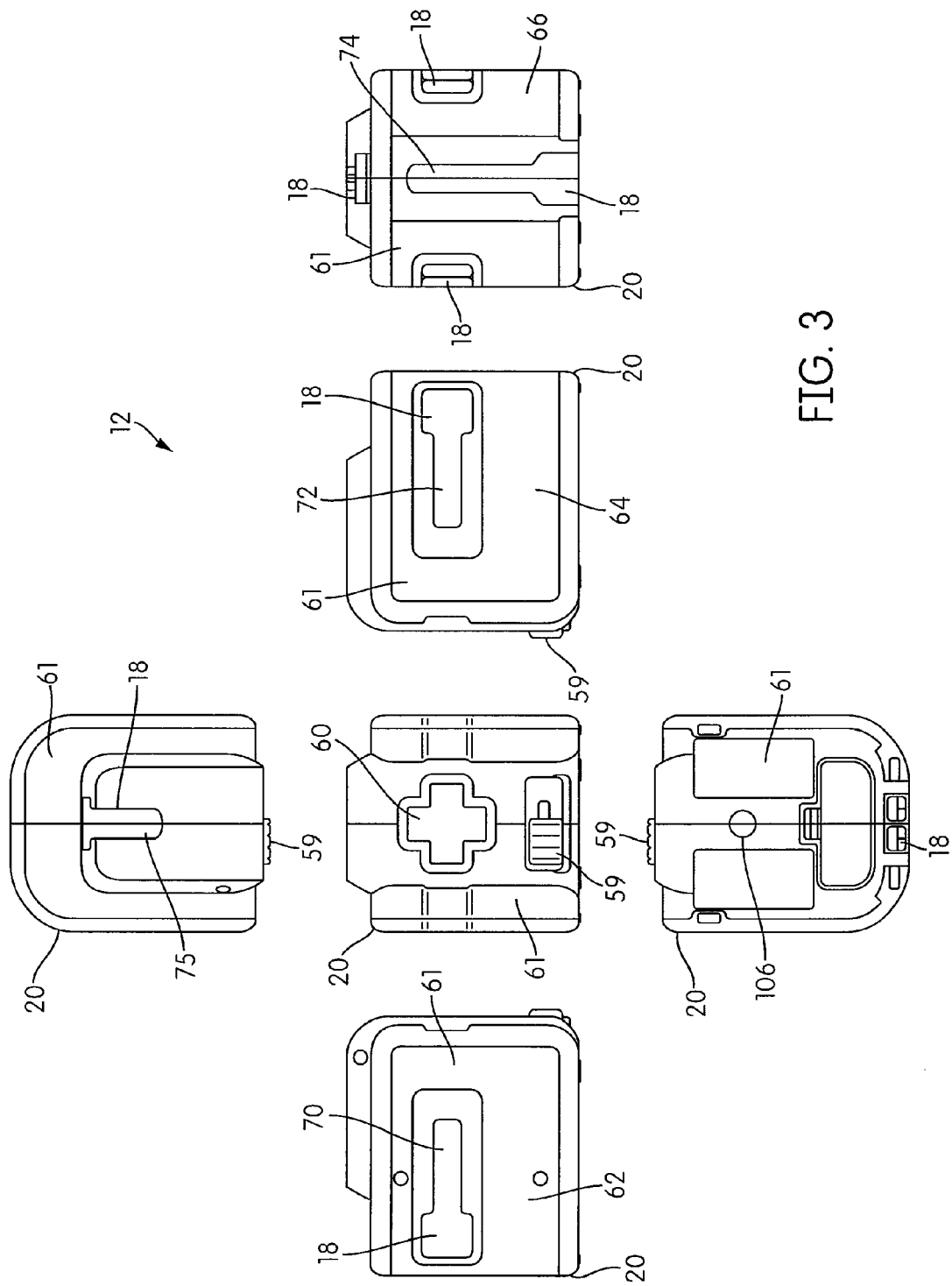
FIG. 3 illustrates a multi-view projection of a laser level.

FIG. 3 illustrates a multi-view projection of laser level 12. As shown in FIG. 3, housing 20 includes a multi-position mode changing switch 59 mounted to housing 20, a beam orifice 60, a plurality of individual external, substantially planar surfaces 61, and/or other components. Multi-position mode changing switch 59 may be and/or may be included in user interface 58 (shown in FIG. 1, FIG. 2). In the example shown in FIG. 3, a first surface 62 has a first orientation and a second surface 64 has a second orientation. Housing 20 is configured such that first surface 62 and second surface 64 generally oppose each other. Housing 20 may include additional surfaces such as a third surface 66 that has a third orientation that is generally perpendicular first surface 62 and second surface 64.

Quick connect mounts 18 in the form of slots are formed in one or more of the external surfaces (e.g., first surface 62, second surface 64, third surface 66) of housing 20. For example, a first quick connect slot 70 is formed in first surface 62 such that first quick connect slot 70 is configured to removably engage quick connect tool mounting bracket 14 (shown in FIG. 1) in the first orientation. A second quick connect slot 72 is formed in second surface 64 such that second quick connect slot 72 is configured to removably engage quick connect tool mounting bracket 14 (FIG. 1) in the second orientation. FIG. 3 shows a third quick connect slot 74 formed in third surface 66 such that third quick connect slot 74 is configured to engage quick connect tool mounting bracket 14 in the third orientation. FIG. 3 also shows a fourth quick connect slot 75 in a top surface of the housing 20. These alternative slots 18, 70, 72, 74, 75 enable the level 12 to be mounted to the bracket 14 in a variety of different orientations, depending on how the user intends to use the level 12.

Figure 4A:
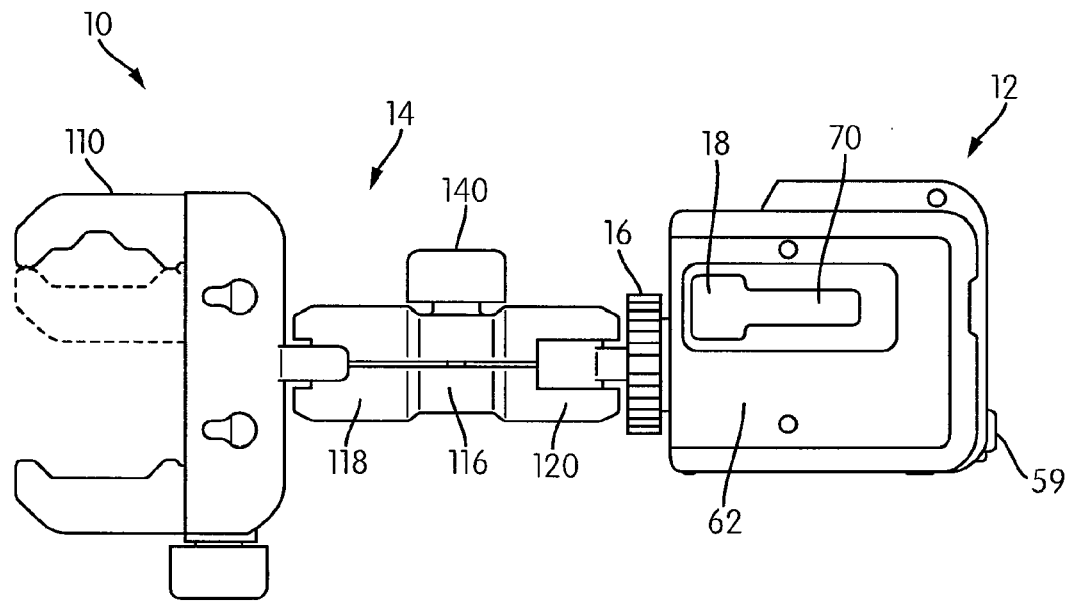
FIG. 4 illustrates a laser level removably engaged with a quick connect tool mounting bracket in two different orientations.
Figure 4B:
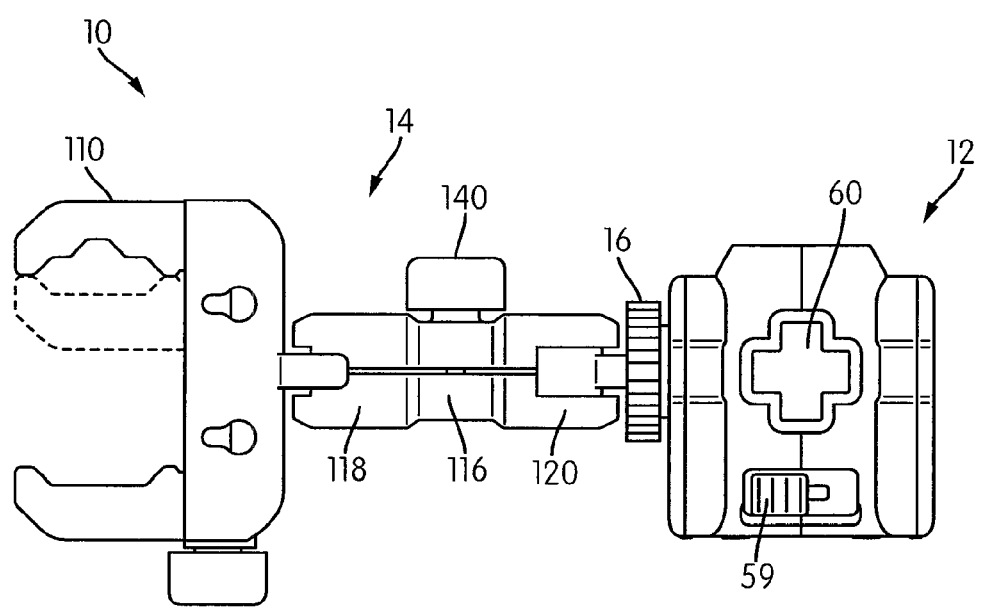

By way of a non-limiting example, FIG. 4 illustrates laser level 12 removably engaged with quick connect tool mounting bracket 14 in two different orientations. In FIG. 4(*a*), laser level 12 is removably engaged with quick connect tool mounting bracket 14 via third quick connect slot 74 formed in third surface 66 (shown in FIG. 3). In FIG. 4(*b*), laser level 12 is removably engaged with quick connect tool mounting bracket 14 via first quick connect slot 70 formed in first surface 62 (shown in FIG. 4(*a*)). As shown in FIG. 4, a user may direct the projected laser planes in different directions by connecting the bracket 14 to different slots 70, 72, 74, 75 without changing the position of quick connect tool mounting bracket 14.

Returning to FIG. 3, FIG. 3 is not intended to be limiting. The number of mounts/slots on an individual surface, the orientation of each mount/slot, the dimensions of the mounts/slots, the cross-sectional shape of the mounts/slots, and or other factors may vary. Quick connect mounts 18 may include holes, orifices, openings, apertures, clefts, gaps, spaces, and/or other features in addition to and/or instead of slots in the individual external surfaces of housing 20. Quick connect mounts 18 may include locking mechanisms in each individual mount such that adapter 16 is locked in place in an individual mount. In some embodiments, mounts 18 may include unlocking features (e.g., a button) operated by the user to unlock adapter 16 from an individual mount 18. In some embodiments, adapter 16 may be held in place by geometric features of the individual mounts. For example, an individual surface may include two different mounts/slots oriented in opposite directions. An individual surface may not include any mounts. Adapter 16 may engage a first mount 18 in a sliding engagement and a second mount 18 via a post hole that locks adapter 16 into the post hole by way of a locking mechanism and/or tapered geometry of the post hole and/or adapter 16.

Figure 5A:
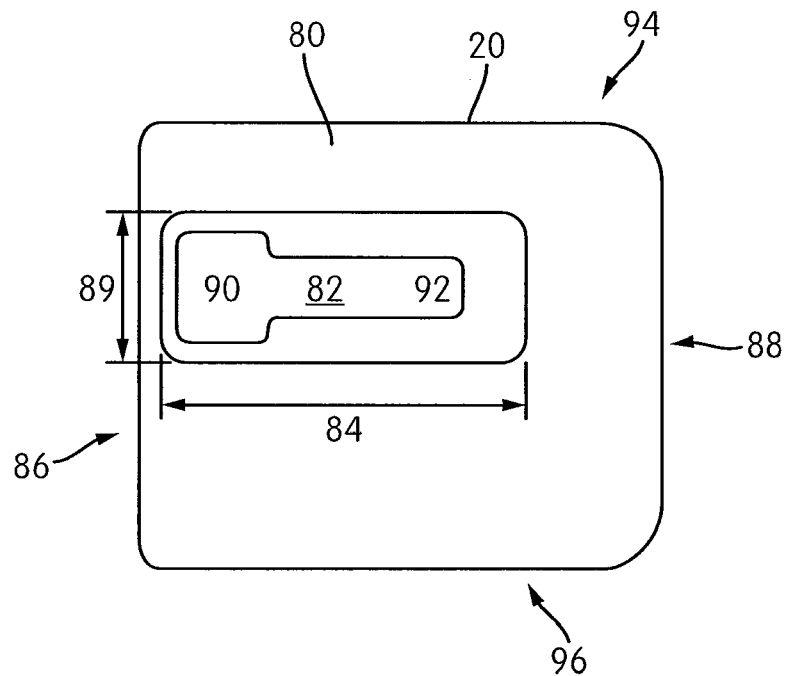
FIG. 5 shows a surface of a housing including a quick connect mount.

FIG. 5 shows a surface 80 of housing 20 including a quick connect slot 82. As shown in FIG. 5(*a*), quick connect slot 82 has a length 84 running from at or near a first end 86 toward a second end 88, and a width 89 that is substantially perpendicular to the length. Quick connect slot 82 may include an insert portion 90 and an engagement portion 92. As shown in FIG. 5, insert portion 90 may be wider and shorter than engagement portion 92. Insert portion 90 may be configured to initially receive quick connect adapter 16 (shown in FIG. 1). Engagement portion 92 may form a slot and/or other features such that quick connect adapter 16 (FIG. 1) may be moved to a desired location within engagement portion 92 by a user. In some embodiments, slot 82 may be oriented such that insert portion 90 is located toward second end 88, toward a third end 94, and/or toward a fourth end 96. Correspondingly, engagement portion 152 may be located toward first end 86, fourth end 96, and/or third end 94. In some embodiments, quick connect slot 82 may be oriented diagonally and/or in other orientations on surface 80.

Figure 5B:
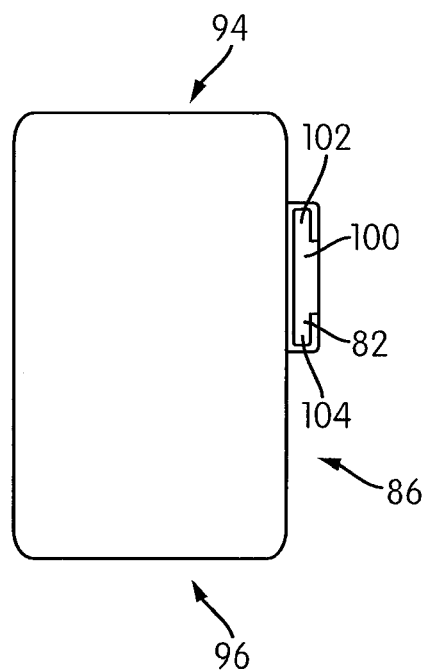

As shown in FIG. 5(b), quick connect slot 82 may have a "T" shaped cross-sectional area 100. Quick connect adapter 16 (FIG. 1) may be configured such that at least a portion 152 (described below) of quick connect adapter 16 engages engagement portion 92 (FIG. 5(a)) at locations 102 and 104 in quick connect slot 82 toward third end 94 and/or fourth end 96.

Returning to FIG. 3, in some embodiments, housing 20 includes a female threaded hole 106 and/or other features in at least one of the plurality of individual external, substantially planar surfaces. The female threaded hole and/or other features may allow laser level 12 to be coupled with various standard mounting devices (e.g., a ¼"-20 externally threaded shaft that is commonly used in camera tripods and other camera mounting equipment).

Returning to FIG. 1, mounting bracket 14 includes a clamp 110, a first ball 112, a second ball 114, a double socket arm 116, quick connect adapter 16, and/or other components. Clamp 110 is configured to removably couple with an external base support. For example, a user may removably couple clamp 110 with a table top, a table leg, a ladder, a shelf, a door frame, and/or other external supports. Examples of clamp 110 may include a C-clamp, a band clamp, a bar clamp, a magnetic clamp, a set screw, and/or other types of clamps.

First ball 112 is fixed to clamp 110. First ball 112 is configured to form a portion of a first ball-and-socket joint 118. Second ball 114 is configured to form a portion of a second ball-and-socket joint 120. Second ball 114 includes a quick connect adapter mounting portion 122. In some embodiments, quick connect adapter mounting portion 122 is a threaded post (e.g., a standard threaded post as used in camera mounting equipment, for example an externally threaded ¼" post). Quick connect adapter 16 may be threaded to quick connect adapter mounting portion 122.

Double socket arm 116 has a first end 130 and a second end 132. First end 130 of double socket arm 116 is configured to removably couple with first ball 112 to form first ball-and-socket joint 118. Second end 132 of double socket arm 116 is configured to removably couple with second ball 114 to form second ball-and-socket joint 120. Double socket arm 116 is configured to set a position of second ball 114 relative to first ball 112 responsive to being selectively tightened on first ball 112 and second ball 114 by a user via a tightener 140. Double socket arm 116 is configured such that the position of second ball 114 is adjustable by rotation of double socket arm. 116 via first ball-and-socket joint 118 while double socket arm 116 is not tightened on first ball 112. Second ball 114 is configured such that a position of quick connect adapter mounting portion 122 is adjustable via rotation of second ball 114 in second ball-and-socket joint 120 while double socket arm 116 is not tightened on second ball 114.

When the adapter mounting portion 122 is being used as a conventional mounting portion, the adapter 16 may be stored inside a rubber grommet on the tightener 140 or otherwise attached to another part of the bracket 14 for safe keeping.

The relative positions of the balls and sockets of the ball-and-socket joints 118, 120 may be reversed without deviating from the scope of the present invention (e.g., such that the clamp 110 connects to a socket 118, rather than a ball 112, and/or the portion 122 connects to a socket 120, rather than a ball 114). In such an embodiment, the balls 112, 114 could be spaced apart and connected to each other in the shape of a dumbbell. In such an embodiment, the clamps of the ball-and-socket joints may be independently tightened and loosened.

For example, FIG. 6 illustrates various aspects of mounting bracket 14. FIG. 6 illustrates clamp 110 located at a first end 160 of bracket 14, double socket arm 116, quick connect adapter 16 located at a second end 162 of bracket 14, and/or other features of bracket 14. FIG. 6(a) and FIG. 6(b) show a first view 166 of bracket 14. FIG. 6(c) and FIG. 6(d) show a second view 168 of bracket 14.

Figure 6A:
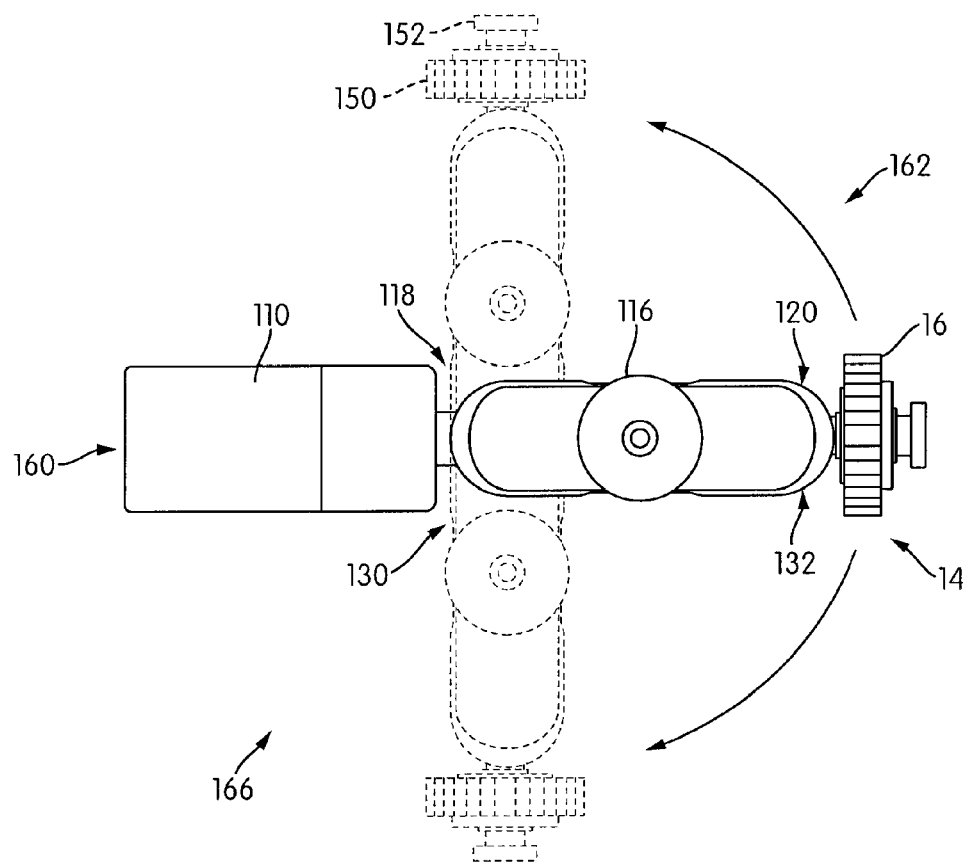
FIG. 6 illustrates various aspects of a mounting bracket.
Figure 6B:
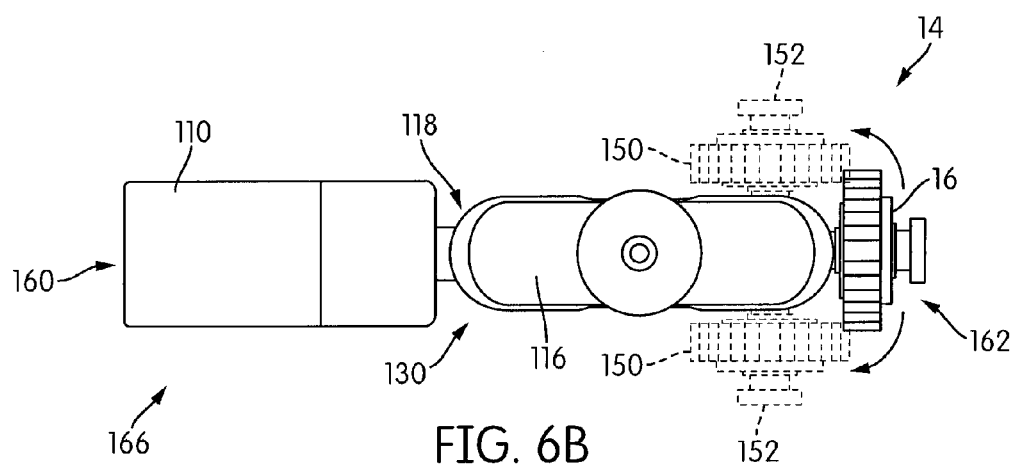

FIG. 6(a) illustrates rotation of double socket arm 116 via first ball-and-socket joint 118. Tightener 140 (shown in FIGS. 6 (c) and (d)) may be loosened by a user to allow first end 130 of double socket arm 116 to rotate around first ball 112 in first ball-and-socket joint 118 to set a position of quick connect adapter 16 (coupled with second ball 114 (not shown)). FIG. 6(b) illustrates rotation of quick connect adapter 16 via second ball-and-socket joint 120. A user may rotate double socket arm 116 and/or quick connect adapter 16 to customize the orientation of laser level 12 (not shown) when laser level 12 is engaged with quick connect adapter 16.

Figure 6C:
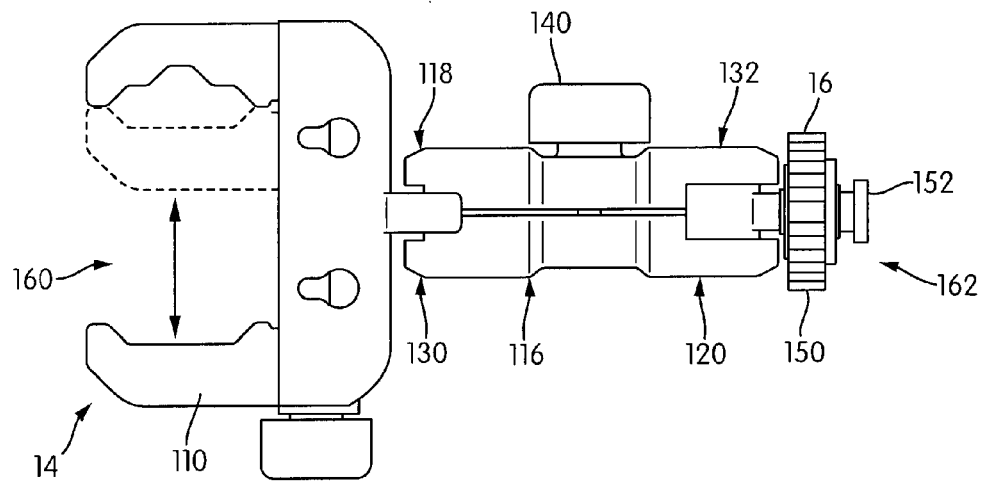
Figure 6D:
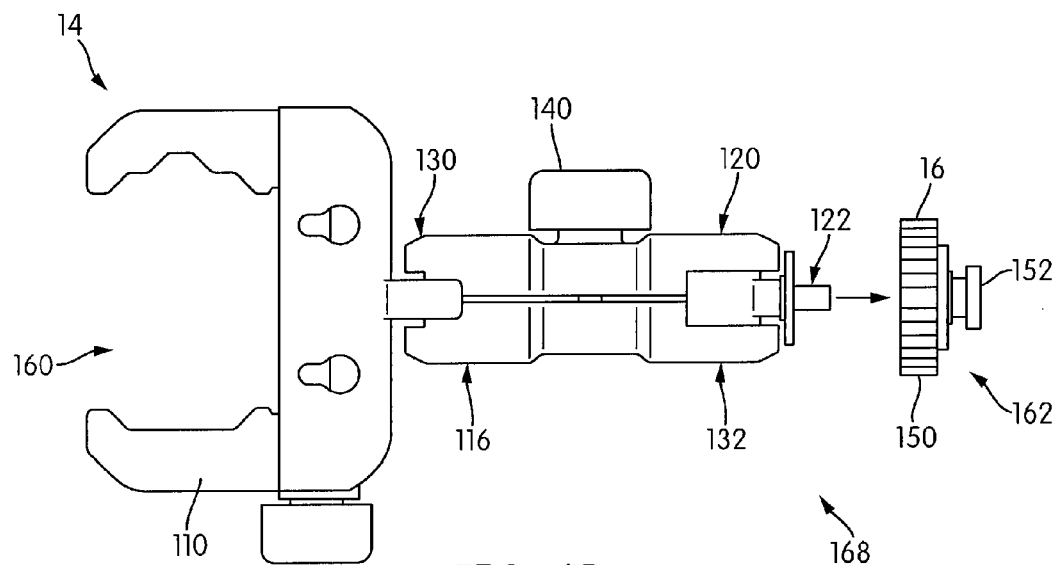

FIG. 6(c) illustrates closing clamp 110. As discussed herein, clamp 110 may be removably coupled with any external support (e.g., a table, a bench, a wall, a door frame, etc.) that allows system 10 to function as described herein. FIG. 6(d) illustrates quick connect adapter 16 decoupled from quick connect adapter mounting portion 122. In the example shown in FIG. 6(d), quick connect adapter mounting portion 122 is a threaded post, and the adapter 16 includes a mating internally threaded hole. This is not intended to be limiting. Quick connect adapter mounting portion 122 may have any form that allows it to function as described herein.

Returning to FIG. 1, quick connect adapter 16 is removably and/or threadingly coupled with quick connect adapter mounting portion 122. For example, a user may slide, thread and/or otherwise couple a first end 154 of quick connect adapter 16 with quick connect adapter mounting portion 122 and turn a rotating portion 150 of quick connect adapter 16 to tighten quick connect adapter 16 on quick connect adapter mounting portion 122. Quick connect adapter 16 may be threaded, and/or include features of a chuck, a collet, and/or other coupling devices to facilitate connection of the adapter 16 to the quick connect adapter mounting portion 122. A second end 156 or quick connect portion 152 of quick connect adapter 16 is configured to removably engage a corresponding quick connect mount 18 formed in tool housing 20. In some embodiments, a cross-section of at least a portion 152 of quick connect adapter 16 at or near second end 156 is "T" shaped. For example, the portion 152 may comprise a protrusion with (a) a distal head that is larger than the narrow engagement portion 92 of the mount 18, but smaller than the enlarged portion 90 of the mount 18, and (b) a neck that is smaller than the narrow engagement portion 92 of the mount (see FIG. 5(*a*)). The portion 152 may be configured to engage quick connect mounts 18. In some embodiments, quick connect adapter 16 has other cross-sectional shapes.

In the illustrated embodiment, laser level 12's quick connect mounts 18 comprise slots, and the mating portion 152 of the quick connect adapter 16 comprises a protrusion 152 with an enlarged head. However, the relative positions of the slots/mounts 18 and protrusion 152 may be switched without deviating from the scope of the present invention. Alternatively, the quick connect slots/mounts 18 of level 12 and mating quick connect portion 152 of the quick connect adapter 16 may comprise any other type of suitable quick connect mechanism (e.g., bayonet-style push-and-twist connection, spring-loaded pins and catches, etc.) without deviating from the scope of the present invention).

Figure 9A:
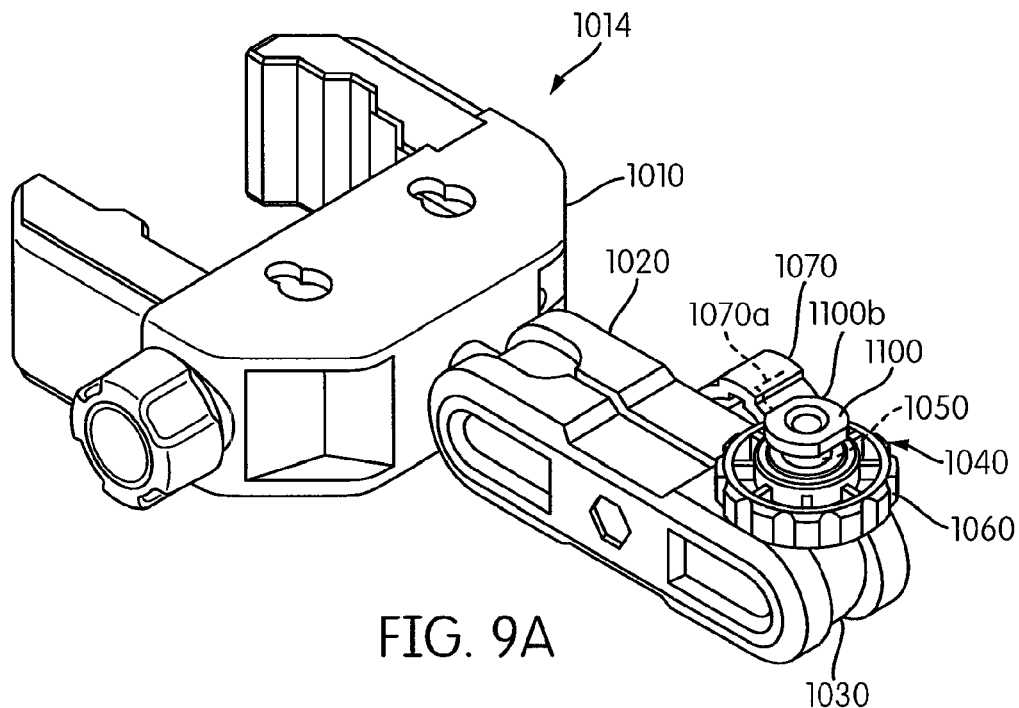
FIG. 9(a) is a perspective view of a quick connect tool mounting bracket according to an alternative embodiment, with a quick connect adapter mounted thereto.
Figure 9B:
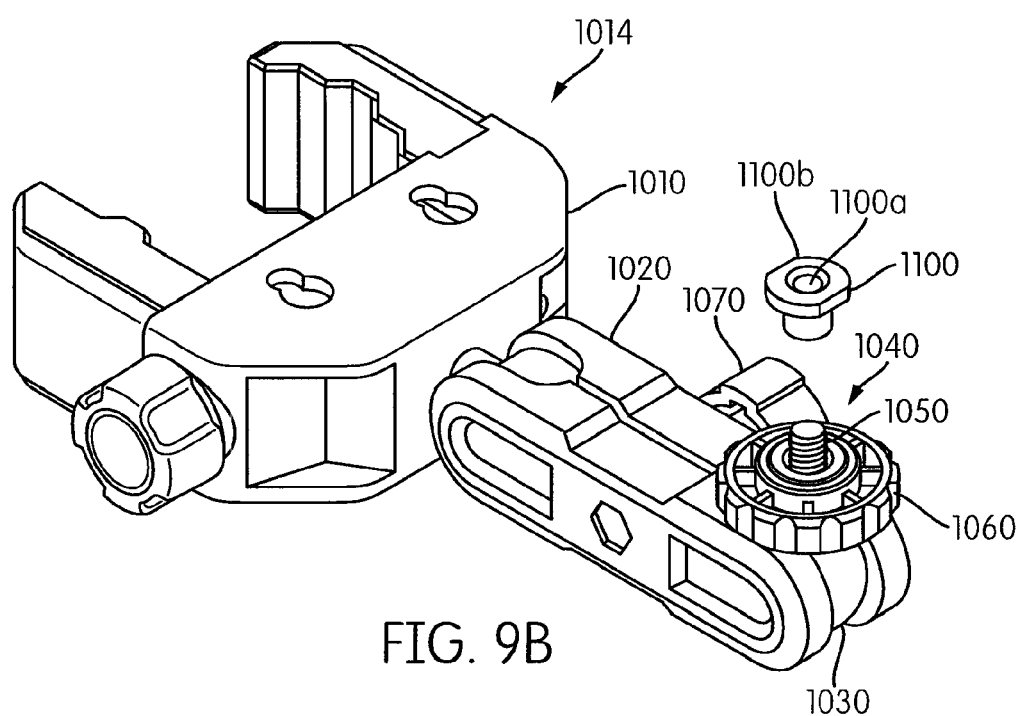
FIG. 9(b) is a perspective view of the quick connect tool mounting bracket of FIG. 9(a), with the quick connect adapter disconnected.

FIGS. 9(*a*) and 9(*b*) illustrate a bracket 1014 according to an alternative embodiment that is generally similar to the bracket 14. Accordingly, features of the bracket 1014 that are also in the bracket 14 are not described in detail. As shown in FIGS. 9(*a*) and 9(*b*), like the bracket 14, the bracket 1014 includes a clamp 1010 connected to a first ball-and-socket joint 1020, which is connected to a second ball-and-socket joint 1030, which is connected to a standard camera mount 1040 (shown in FIG. 9(*b*)). The camera mount 1040 includes a ¼"-20 threaded post 1050 and a collar 1060. Although the illustrated threads are ¼"-20, as is common in the camera art, alternative types of threads may be used (e.g., with different diameter and/or pitch) without deviating from the scope of the present invention. The post 1050 is rigidly connected to the second ball-and-socket joint 1030 so as to prevent rotation of the post 1050 when the ball-and-socket joint 1030 is locked (e.g., by tightening the tightener 1070). The collar 1060 is internally threaded and threaded onto the post 1050 (either onto the ¼"-20 threads or a separate larger set of threads that are co-axial with the ¼"-20 threads). As shown in FIG. 9(*b*), to connect the bracket 1014 to a camera or other tool with a camera mount portion such as the level 12, the ¼"-20 threads of the post are threaded into mating internal threads of a camera or other tool (e.g., the internally threaded hole 106 of the level 12). To tighten the tool or level 12 to the bracket 1014, the collar 1060 is then rotated counterclockwise to pinch up against an underside of the camera or level 12.

In the embodiment illustrated in FIGS. 9(*a*) and 9(*b*), the bracket 1014 includes a quick connect adapter 1100. The adapter 1100 has internal threads 1100*a* that may be threaded onto the post 1050 to attach the adapter 1100 to the bracket 1014. To attach the bracket 1014 to the level 12 via the quick connect mechanism, an enlarged head 1100*b* is inserted into any one of the slots/quick connect mounts 18 of the level 12 in the same manner as discussed above with respect to the bracket 14. As shown in FIGS. 9(*a*) and 9(*b*), the enlarged head 1100*b* has flat portions that abut internal sides of the slot 18 in the level 12 to prevent the adapter 1100 from rotating relative to the level 12 when the adapter 1100 is in the slot 18. Once the adapter 1100 is positioned in the narrow region of the slot 18, the collar 1060 may be rotated counterclockwise to pinch the portion of the housing 20 defining the slot 18 between the enlarged head 1100*b* and the collar 1060, thereby frictionally discouraging or preventing the level 12 from moving relative to the adapter 1100, collar 1060, and ball of the ball-and-socket joint 1030. Instead of rotating the collar 1060 counterclockwise, the level 12 and adapter 1100 may be rotated clockwise together to move the level 12 toward and into pinching engagement with the collar 1060. The level 12 may be locked to the bracket 1014 in any desired pivotal position about the axis of the post 1050. The level 12 may be detached from the bracket 1014 by reversing these steps. When the adapter 1100 is not being used, it may be stored in a pocket 1070*a* formed in the tightener 1070.

Power source 40 is configured to power controller 22, lock 27, laser generator (diode(s)) 30, user interface 58, and/or other components of system 10 in a portable manner. Power source 40 may comprise one or more power sources connected in series and/or in parallel. In some embodiments, power source 40 is rechargeable. Power source 40 may be recharged via a home AC power source, a car battery outlet, a USB port, a non-contact charging circuit, and/or other recharging methods. Examples of portable power sources that may be included as portable power source 40 include one or more DC batteries, lithium ion and/or lithium polymer cells, nickel metal hydride, and/or other portable power sources.

Although the present technology has been described in detail for the purpose of illustration based on what is currently considered to be the most practical and preferred embodiments, it is to be understood that such detail is solely for that purpose and that the technology is not limited to the disclosed embodiments, but, on the contrary, is intended to cover modifications and equivalent arrangements that are within the spirit and scope of the appended claims. For example, it is to be understood that the present technology contemplates that, to the extent possible, one or more features of any embodiment can be combined with one or more features of any other embodiment.

What is claimed is:

1. A laser level system, the laser level system comprising a laser level, the laser level comprising:
    a housing including a plurality of external surfaces;
    a first quick connect mount supported by the housing and disposed in a first orientation, the first quick connect mount being configured to removably engage a quick connect tool mounting bracket in the first orientation;
    a second quick connect mount supported by the housing and disposed in a second orientation that differs from the first orientation, the second quick connect mount being configured to removably engage the quick connect tool mounting bracket in the second orientation;
    at least one laser generator disposed in the housing and configured to emit at least one laser beam;
    a self-leveling mechanism disposed in the housing and configured to orient the at least one laser beam in a predetermined direction relative to gravity; and
    further comprising one or more optical components disposed in the housing and configured to convert the at least one laser beam into a horizontal fan beam and a vertical fan beam that intersects the horizontal fan beam.

2. The system of claim 1, wherein the first quick connect mount comprises a first slot in the housing, and wherein the second quick connect mount comprises a second slot in the housing.

3. The system of claim 1, wherein the first quick connect mount is disposed on an opposite side of the housing from the second quick connect mount.

4. The system of claim 1, further comprising a third quick connect mount supported by the housing and disposed in a third orientation that differs from the first and second orientations, the third quick connect mount being configured to removably engage the quick connect tool mounting bracket in the third orientation.

5. The system of claim 4, wherein the first, second, and third orientations are generally orthogonal to each other.

6. A laser level system, the laser level system comprising a laser level, the laser level comprising:
a housing including a plurality of external surfaces;
a first quick connect mount supported by the housing and disposed in a first orientation, the first quick connect mount being configured to removably engage a quick connect tool mounting bracket in the first orientation;
a second quick connect mount supported by the housing and disposed in a second orientation that differs from the first orientation, the second quick connect mount being configured to removably engage the quick connect tool mounting bracket in the second orientation;
at least one laser generator supported by the housing and configured to emit at least one laser beam; and
a self-leveling mechanism supported by the housing and configured to orient the at least one laser beam in a predetermined direction relative to gravity; and
further comprising a quick connect tool mounting bracket comprising:
a clamp configured to removably clamp to an external base support; and
a quick connect portion connected to the clamp, the quick connect portion being configured to alternatively and removably engage either of the first and second quick connect mounts so as to connect the housing to the quick connect tool mounting bracket in either the first or second orientation.

7. The system of claim 6, wherein the clamp is connected to the quick connect portion via first and second serial ball-and-socket mechanisms, the balls of the first and second ball-and-socket mechanisms being spaced from each other.

8. The system of claim 6, wherein:
the quick connect portion comprises one of a slot and a protrusion with an enlarged head;
the first and second quick connect mounts each comprise the other of the slot and the protrusion with the enlarged head; and
the slot and enlarged head are configured to releasably engage each other so as to provide a quick connect connection between the laser level and the quick connect tool mounting bracket.

9. The system of claim 6, wherein the first quick connect mount is disposed on an opposite side of the housing from the second quick connect mount.

10. The system of claim 6, further comprising a third quick connect mount supported by the housing and disposed in a third orientation that differs from the first and second orientations, the third quick connect mount being configured to removably engage the quick connect tool mounting bracket in the third orientation.

11. The system of claim 10, wherein the first, second, and third orientations are generally orthogonal to each other.

12. The system of claim 6, further comprising one or more optical components configured to convert the at least one laser beam into a horizontal fan beam and a vertical fan beam that intersects the horizontal fan beam.

13. A laser level system, the laser level system comprising:
a housing including a plurality of external surfaces;
at least one laser generator supported by the housing and configured to emit at least one laser beam;
a self-leveling mechanism supported by the housing and configured to orient the at least one laser beam in a predetermined direction relative to gravity; and
a controller configured to control the at least one laser generator, the controller having at least the following user-selectable modes:
an off mode wherein the at least one laser generator is off;
a self-leveling mode wherein,
responsive to the housing being tilted to less than or equal to a tilt angle threshold level, the at least one laser generator is on and the self-leveling mechanism orients the at least one laser beam in the predetermined direction relative to gravity,
responsive to the housing being tilted past the tilt angle threshold level, the controller is configured to provide a visually perceptible out-of-level indication; and
a manual mode wherein the controller is configured to sequentially turn the at least one laser generator on and off repetitively to provide a visually perceptible manual mode indication,
wherein the out-of-level indication is different than the visually perceptible manual mode indication.

14. The laser level system of claim 13, further comprising a self-leveling mechanism lock having an ON state that deactivates the self-leveling mechanism and locks an orientation of the at least one laser beam into a locked position relative to the housing, regardless of the orientation of the housing relative to gravity,
wherein the controller is configured to place the self-leveling mechanism lock in its ON state when in the manual mode.

15. The laser level system of claim 14, wherein the self-leveling mechanism comprises a pendulum pendulously supported by the housing, and wherein the self-leveling mechanism lock prevents pendulous movement of the pendulum relative to the housing when the self-leveling mechanism lock is in its ON state.

16. The system of claim 15 wherein the first quick connect mount comprises a first slot in the housing, and wherein the second quick connect mount comprises a second slot in the housing.

17. The laser level system of claim 14, wherein the controller is configured to place the self-leveling mechanism lock in its ON state when in the off mode.

18. The laser level system of claim 14, wherein, when the controller is in the manual mode such that the self-leveling mechanism lock is in its ON state, at least one of the at least one laser beams is projected from the housing in a direction that is parallel to a reference surface defined by the housing regardless of the orientation of the housing relative to gravity.

19. The laser level system of claim 13, wherein the self-leveling mechanism comprises a pendulum pendulously supported by the housing, the pendulum pendulously supporting the laser generator.

20. The laser level system of claim 13, wherein the controller is configured such when in self-leveling mode and the housing is tilted to less than or equal to the tilt angle threshold, the controller causes the at least one laser generator to continuously project the at least one laser beam.

21. The laser level system of claim 13, wherein the visually perceptible out-of-level indication comprises a sequential turning on and off of the at least one laser generator repetitively in a repetitive on/off pattern that differs from a repetitive on/off pattern used to provide the visually perceptible manual mode indication.

22. The laser level system of claim 21, wherein the at least one laser generator is on a greater percentage of the time when in the manual mode than during the out-of-level indication.

* * * * *